(12) United States Patent
Lee et al.

(10) Patent No.: US 9,174,149 B2
(45) Date of Patent: Nov. 3, 2015

(54) METHOD AND DEVICE FOR CLEANING NON-FIXED MEDIA FILTERS

(75) Inventors: Douglas W. Lee, Calgary (CA); Colin Tyrie, Houston, TX (US); William Bateman, Somerset (GB)

(73) Assignee: EXTERRAN HOLDINGS, INC., Houston, TX (US)

( * ) Notice: Subject to any disclaimer, the term of this patent is extended or adjusted under 35 U.S.C. 154(b) by 1295 days.

(21) Appl. No.: 12/526,464

(22) PCT Filed: Feb. 9, 2007

(86) PCT No.: PCT/US2007/003507
§ 371 (c)(1),
(2), (4) Date: Aug. 7, 2009

(87) PCT Pub. No.: WO2008/100245
PCT Pub. Date: Aug. 21, 2008

(65) Prior Publication Data
US 2010/0320159 A1 Dec. 23, 2010

(51) Int. Cl.
 B01D 24/46 (2006.01)
 B01D 24/38 (2006.01)
 B01D 24/14 (2006.01)
(52) U.S. Cl.
 CPC .......... *B01D 24/14* (2013.01); *B01D 2201/087* (2013.01)
(58) Field of Classification Search
 None
 See application file for complete search history.

(56) References Cited

U.S. PATENT DOCUMENTS 2,355,815 A 5/1938 McGill
2,773,829 A 11/1956 Hunting
(Continued)

FOREIGN PATENT DOCUMENTS

GB 2 080 694 A 2/1982
GB 2080694 A 2/1982
(Continued)

OTHER PUBLICATIONS

Supplementary European Search Report dated May 26, 2010, for Serial No. 07750351.4.
(Continued)

*Primary Examiner* — Robert James Popovics
(74) *Attorney, Agent, or Firm* — Gowling Lafleur Henderson LLP; D. Doak Horne

(57) ABSTRACT

A method and apparatuses are presented for rejuvenating a bed of granular filter medium that has accumulated contaminants during filtration of a liquid stream. The method first includes the step of establishing a small volumetric flow rate of clean filtrate in reverse flow. Then, the filter media is agitated to break-up contaminants that have become agglomerated on the surface of or within the interstitial spaces of the filter media. The agitating step is accomplished by exposing the liquid-full filter media to a jetting stream comprised mostly of a gas mixed with a clean liquid. The jetting stream is dispersed throughout the filter media through a plurality of radial nozzles located within the filter bed. The radial nozzles disperse the gas within the liquid and filter media causing sufficient turbulence and agitation of the filter media granules to liberate the trapped contaminants without the need for high liquid flow rates. The number of nozzles and their placement within the filter bed are varied depending on factors such as size and shape of the filter vessel and the type of filter media being cleaned. The amount of water and gas flowing through the nozzles is also adjusted to provide substantially uniform cleaning of the entire bed. This method results in lower volumes of clean filtrate being consumed in the backwash cycle and the associated storage and recycle of that liquid back into the process. The radial nozzles are each comprised of two horizontal and parallel circular disks spaced apart to create a cylindrical void through which the pressurized gas and liquid jetting stream flows. The apparatuses presented are a singular filter vessel an a plurality of filter chambers within a common filter vessel each containing granular filter media and a plurality of radial nozzles disposed with the media for dispersing the jetting stream throughout during the cleaning and rejuvenation steps of a filtering process.

41 Claims, 8 Drawing Sheets

(56) References Cited

U.S. PATENT DOCUMENTS

| | | | |
|---|---|---|---|
| 3,384,240 A | 5/1968 | Berardi | |
| 3,680,701 A * | 8/1972 | Holca | 210/790 |
| 3,698,554 A | 10/1972 | Mail | |
| 4,500,435 A | 2/1985 | Müller | 210/798 |
| 4,668,405 A * | 5/1987 | Boze | 210/795 |
| 5,833,867 A | 11/1998 | Hensley | 210/792 |
| 6,428,690 B1 | 8/2002 | Tse | 210/136 |
| 2005/0035071 A1 | 2/2005 | Tolley et al. | |
| 2010/0320159 A1* | 12/2010 | Lee et al. | 210/792 |

FOREIGN PATENT DOCUMENTS

| | | |
|---|---|---|
| GB | 2 251 194 A | 1/1992 |
| GB | 2251194 A | 7/1992 |
| JP | H05-245483 | 9/1993 |
| JP | 2003-093808 | 4/2003 |
| KR | 1998-0013597 | 12/1988 |
| RU | 1816474 | 5/1993 |
| RU | 1816474 A1 | 5/1993 |
| RU | 2134139 | 8/1999 |
| RU | 2134139 C1 | 8/1999 |
| RU | 2264248 | 7/2005 |
| RU | 2264248 C2 | 7/2005 |
| SU | 1077646 | 3/1984 |
| SU | 1547854 | 3/1990 |
| WO | WO 97/18888 | 5/1997 |

OTHER PUBLICATIONS

EPO Communication Pursuant to Article 94(3), dated Mar. 2, 2011, for EP Application No. 07750351.4.
Office Action, dated Feb. 25, 2011, for RU Application No. 2009/1620.1.
Russian Office Action dated Dec. 7, 2010, for Application No. 2009133778, filed Sep. 8, 2009.
PCT International Search Report and Written Opinion dated Aug. 7, 2008, for International Patent Application No. PCT/US2007/003507.
Hungarian Intellectual Property Office Search Report mailed Apr. 18, 2013 and Repraced Written Opinion mailed May 30, 2013 for Singapore Patent Application No. 201200918-9.
Va Golubiantnikov and V.V. Shuvalov, textbook, "Automation of the Production Process in the Chemistry Industry", Chemistry, 1985, p. 16, para. 3 [translated].

* cited by examiner

METHOD AND DEVICE FOR CLEANING NON-FIXED MEDIA FILTERS

This application is a §371 U.S. national phase application of International Application No. FCT/US2007/003507 filed Feb. 9, 2007, the entire contents of which are incorporated by reference herein.

BACKGROUND OF THE INVENTION

1. Field of the Invention

The present invention relates generally to the field of liquid filtration using unfixed filter media, and more specifically to a method and system for removing filtered contaminants from these type filter beds during periodic cleaning cycles.

2. The Prior Art

Various types of methods and systems have been used in the prior art to remove accumulated contaminants from a bed of granular filter medium. The methods utilized to date generally have these common processing steps: 1) providing an agitation means to break-up agglomerations of filter media and contaminants typically formed during the filtration process, 2) flowing a carrier medium through the agitated granules to mobilize the contaminants away from the filter media, 3) retaining the filter media within the filter while allowing contaminants to flow out, and 4) returning the cleaned filter media back to its normal state. These four steps can be condensed to the following: 1) agitation, 2) washing, 3) separating, and 4) reforming.

With regard to common Step 1, various means are disclosed to agitate the filter media such as rotary blades and high-velocity liquid jets (See U.S. Pat. Nos. 2,521,396 and 3,992,291/3,953,333). However, both of these methods create at least two significant problems. First, rotary blade systems often have mechanical seals that require frequent maintenance. Second, the high-velocity liquid jets produce large volumes of dirty backwash water that must be stored and recycled through the process. What is needed in the art is an agitating means that does not require rotating internal baffles or impellers and minimizes liquid usage.

With regard to common step 2, the carrier medium used to flush the filter media is most commonly the clean filtrate fluid. In many systems, large volume storage of clean filtrate is required to provide surge capacity when the backwash cycle draws a high-volume rate to flush the media during this step. Some methods utilize the high-volume water jets to both agitate and back flush, which is a combination of common steps 1 and 2. However, such systems still generate large volumes of backwash liquid that must be stored and recycled back through the process. Also, it would be preferred to utilize contaminated process fluid for backwashing instead of clean filtrate. This would avoid having to have clean filtrate storage vessels and pumps specifically for periodic backwashing cycles.

With regard to common step 3, separation of the contaminants from the filter media is typically done by flowing the slurry in a continuous flow path over a cleaning element, located external to the filter housing, where interspersed larger particulates are removed from the slurry, and returning the withdrawn filter material back to the filter housing (See U.S. Pat. Nos. 3,992,291 and 3,953,333). This method adds significant cost and size to the filter since it requires various external conduits, vessels, valves and equipment. U.S. Pat. No. 4,787,987 discloses an in-situ method of separating the contaminants from the filter media by a screen, of size slightly smaller than the filter media size, contained within the vessel below the filter media. That method agitates and slurrifies the media and contaminants by action of a high-volume liquid pump. During this agitation step, make-up liquid is added to the vessel at substantially the same rate that the concentrated contaminated liquid is removed through the screen means while the filter media is retained within the filter housing.

The present invention is directed in part, to a novel means of in-situ agitation and fluidization of filter media granules to sufficiently liberate collected contaminants as rapidly as possible and flushing those contaminants from the filter housing the least amount of liquid necessary. Other advantages that are inherent in the disclosed and claimed invention will be apparent of those of ordinary skill in the art.

SUMMARY OF THE INVENTION

The inventors present a novel method of in-situ cleaning of agglomerated contaminants from granular filter media. This method combines a low rate of contaminated liquid with a gas, such as air or natural gas, to create a jetting stream. This jetting stream is dispersed into the filter media through one or more radial nozzles disposed within the filter media. The gas exits the radial nozzles as a bubble dispersion within the liquid. As the jetting stream rises up through the filter media, it expands the bed to break large contaminant agglomerations and fluidizes the individual filter media granules to dislodge and mobilize smaller contaminant agglomerations within the interstitial spaces of the filter media. This fluidizing action provides the requisite degree of agitation of the media to loosen and mobilize contaminant agglomerations without the need for high liquid space velocities common to other filter cleaning methods.

This method provides the benefit of allowing use of contaminated process liquid in the jetting stream, which eliminates the need for storing clean filtrate for use during backwash cycles.

This method provides the further benefit of minimizing the volume of contaminant-laden liquid water that must be reprocessed. Other filter cleaning methods require large liquid volume rates, up to 1.5 times the incoming liquid rate during normal operation, to provide sufficient interstitial velocity to mobilize contaminants away from the filter media. Lower backwash volumes reduce ancillary equipment costs and reprocessing costs.

This method provides the further benefit of reducing the cleaning cycle time. Other filter cleaning methods flow the gas separately through the filter media to break contaminant agglomerations followed by liquid flow through the media to flush contaminants away. By combining the agitation step with the flushing step, cleaning cycle times can be significantly reduced. Shorter cleaning cycle times will provide improved overall performance of the filter system.

This method provides the further benefit of allowing optimization of media cleaning cycle for a variety of filtering process. By adjusting the ratio of gas to liquid in the jetting stream and; if necessary, the size and location of the radial jetting nozzles, the cleaning cycle can accommodate a broader variety of contaminate loading rates, agglomeration tendencies, and physical characteristics.

In a preferred embodiment of the invention, a granular media filter is described that is comprised of a filter housing in which the media is contained and settled by gravity onto the bottom of the filter housing to form a bed. The filter housing bottom has an outlet port to which is attached a mechanical sieve, such as wedge-wire or slotted pipe. The mechanical sieve slots are smaller than the filter media granules so that as the process liquid flows through the filter, the clean filtrate exits the outlet port while the filter granules are retained within the filter housing. During normal filter operation, contaminated liquid flows from an inlet port connected to distributor and mechanical sieve and flows through the filter media bed, depositing contaminants on top of, within the interstitial spaces of and the surface of the filter media.

When sufficient levels of contaminants are trapped within the filter housing, normal flow to the filter housing is stopped and a cleaning cycle is initiated. The embodiment filter housing has a single radial nozzle, or a plurality of evenly spaced radial nozzles depending on the filter housing diameter, placed just above the bottom of the filter bed. A conduit or, pipe runs from a nozzle with a connection on the outside of the filter housing to the radial nozzle. During the cleaning cycle, a controlled rate of a jetting stream flows through the radial nozzles, up through the filter media, and up towards the inlet port distributor/mechanical sieve. The jetting stream is comprised of a mixture of gas and liquid formed outside of the filter housing and transported to the radial nozzles via the connecting conduit. The radial nozzle is designed to create an optimum dispersion of the gas and liquid components so that the mixture can simultaneously agitate the filter granules and flush out contaminates from the interstitial spaces of the media.

As the jetting stream, liberated contaminants, and some fluidized filter granules flow towards the inlet port, the mechanical sieve retains the fluidized granules within the filter housing while allowing the jetting stream and contaminants to exit the filter housing. The embodiment further includes a vent port at the top of the filter housing to allow trapped gas from the jetting stream to escape prior to returning the filter to normal operation.

The rate of gas and liquid mixed to form the jetting stream and used to agitate and flush the contaminants from the filter housing should be selected to account for the following considerations: (1) adequate nozzle exit velocity to produce a uniform gas dispersion within the liquid and substantial coverage of the jetting stream across the media bed cross-section, (2) adequate vertical gas velocity to expand the media bed in order to break large contaminant agglomerations; (3) adequate gas velocity to fluidize and agitate the media granules, and (4) adequate liquid momentum to mobilize and carry liberated contaminants away from the filter bed.

The number and location of the radial nozzles within the filter housing should be selected to account for the following considerations: (1) even distribution of the jetting stream across the filter bed cross-section and minimizing "blindspots" or the volume of filter media uncontacted by the jetting stream; and (2) close enough to the bottom of the media bed so that the nozzle outflow contacts the bottom outlet port mechanical sieve to clean the sieve of filter media collected thereon;

Although the invention has been summarized as including a method and apparatus for removing contaminants from a bed of granular filter media, other uses within the scope of the invention may become apparent to those in the filtration art.

DETAILED DESCRIPTION

Figure 1:
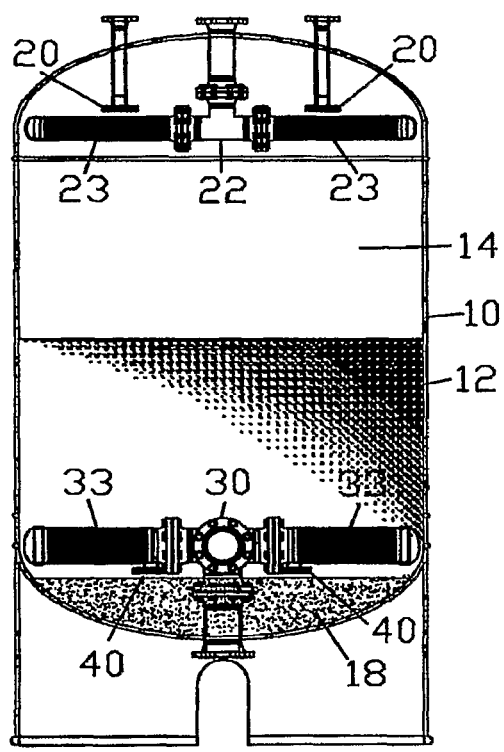
FIG. 1 is a vertical sectional view of a non-fixed media housing, which forms a part of the present invention, showing internal members used to carry out the medial cleaning method herein described.

Referring to FIG. 1, a filter vessel 10 is illustrated for housing a bed 12 of granular filter medium. The filter housing is a pressure-rated vessel having a 2:1 ellipsoidal upper and lower heads. Other filter vessel shapes and designs may be used and will not effect the principle operation of the invention. The granular filter media 12 may be any of a number of materials chosen based upon the characteristics of the liquid to be filtered and the properties of the contaminants. For filtration of water containing suspended oil droplets and solids contaminants, granulated black walnut shells are commonly used. A space 14 exists above the filter bed 12 to provide room for the bed to expand during the cleaning cycle. It will be understood, of course, that any suitable filter housing may be utilized for confining the bed of granular filter material.

The filter vessel 10 also includes inlet distributors 20 for the introduction of contaminated liquid from an exterior conduit and dispersing the liquid substantially uniformly across the cross-section of the filter vessel. A backwash outlet header 22 is also installed in the top of the filter vessel for receiving flow of jetting stream and liberated contaminants during the cleaning cycle. The outlet header also contains a mechanical sieve means 23, shown here as slotted pipe or wedge-wire where the open slots are of a diameter less than the smallest media granule size and prevent any mobilized filter media from escaping the vessel during the backwash cycle. Although this figure shows separate process fluid inlet and backwash outlet means, many inlet distributor designs combine both process fluid distribution and backwash extraction. The description of the inlet is exemplary of a preferred embodiment and that other feed inlets may be utilized depending on the characteristics of the liquid to be filtered and the contaminants contained therein.

FIG. 1 also shows an outlet header 30 to which attached are mechanical sieve means 33, shown here as slotted pipe or wedge-wire. After passing through the filter bed, the cleaned filtrate exits the filter vessel through the openings in the sieve. The diameter of the sieve openings is smaller than the smallest filter media granule diameter so that the media is retained inside the vessel during operation.

Figure 2:
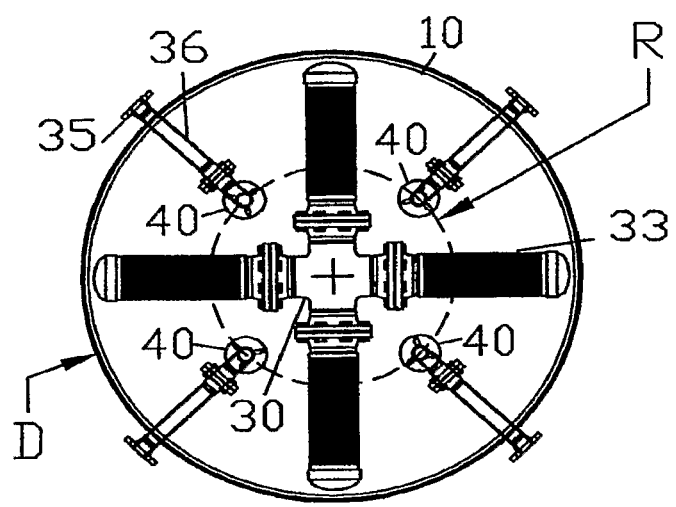
FIG. 2 is horizontal sectional view across the filter housing diameter, which forms part of the present invention, showing one embodiment position of the jetting nozzles in a 45° angle between the filtrate outlet sieve manifold.
Figure 3:
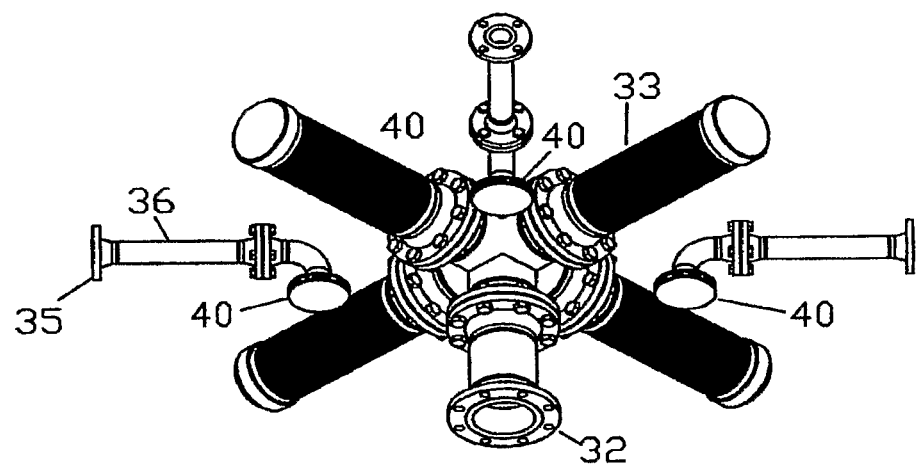
FIG. 3 is a three-dimensional sectional view of FIG. 2 embodiment as viewed from the underside of the filter housing vessel. This view provides further detail of the embodiment presented in FIG. 2.

FIGS. 1 and 2 shows a plurality of radial nozzles 40 having outlets just below the bottom tangent of the mechanical sieves. In the embodiment shown in FIG. 2, the mechanical sieves means 33 is comprised of fours wedge-wire screens forming a cross-shaped outlet header. In this configuration, four radial nozzles 40 are placed within the spaces between the four mechanical sieves 33 in the outlet header. Of course, it is to be understood to those skilled in the art that the size and shape of the outlet sieve means and the number of radial nozzles employed will be dependent on the diameter of the filter housing.

The radial nozzles 40 shown in FIGS. 1 and 2 are comprised of two horizontal circular discs spaced-apart to create a void through which the jetting stream flows into the filter media bed during the cleaning cycle. The elevation of the radial nozzle outlet void is shown approximately even with the bottom tangent of the mechanical sieve pipes 33. In many filter vessels, the bottom vessel head is filled with a solid material, such as grout or concrete, up to the bottom of the mechanical sieve pipes. This solid material acts as a support base for the filter media granules during normal filter operations since filter media below the mechanical sieve pipes is essentially of no effective use. Normally, the radial nozzle outlet voids are placed near the bottom tangent of the sieves pipes 33 so that filter media near the base of the tank can be contacted by the jetting stream. The placement of nozzles near the base of the filter media bed also allows the jetting stream to clear the openings of the sieve slots of possible media or contaminant obstructions. For applications where contact with the media near the base or jetting of the sieve is not required or desired, the height of the outlet voids of the radial nozzles may be elevated above the outlet manifold so that the jetting dispersion can penetrate to the full extremities of the vessel without interference from the outlet manifold or sieve screens.

The jetting stream, comprised of a mixture of liquid and gas premixed outside of the filter housing, is carried to the radial nozzle via a conduit 35. This conduit is shown in the drawing as a straight pipe segment connected to a pipe 90° elbow turning down and connected to the top circular disc of radial nozzle.

For most filter vessel sizes shown in FIG. 2, four radial nozzles placed in the proximate center of each quadrant formed by the cross-shaped outlet manifold and sieve pipes will provide adequate to provide coverage of the jetting stream throughout the filter bed cross-section. The lateral extent to which the radial nozzles disperse the jetting stream is predominantly set by the rate of water and gas premixed outside of the filter housing by the filter operator. Therefore, the balance between increasing the water/gas flow rate to each radial nozzle or increasing the number of radial nozzles across the vessel cross-section is largely a question of economics. The inventors have found satisfactory economics by designing each jetting nozzle to clear a region of approximately 1.5 to 3 feet lateral radius from the nozzle centerline. The number of nozzles is increased as needed to substantially cover the cross-section of the filter vessel, while the placement of the nozzles is largely dictated by cross-sectional symmetry.

FIG. 2 shows the placement of the plurality of nozzles across the vessel cross-section in relation to a vessel/nozzle centerline radius R. This vessel nozzle radius R will vary with filter media type, filter vessel diameter, contaminant loading, and contaminant physical properties. The inventors have found that for water filtration of oil and solids using black walnut shells, an R value in the range of 25% to 36% of the vessel diameter D will provide adequate coverage of the jetting stream for effective media agitation cleaning.

Figure 4:
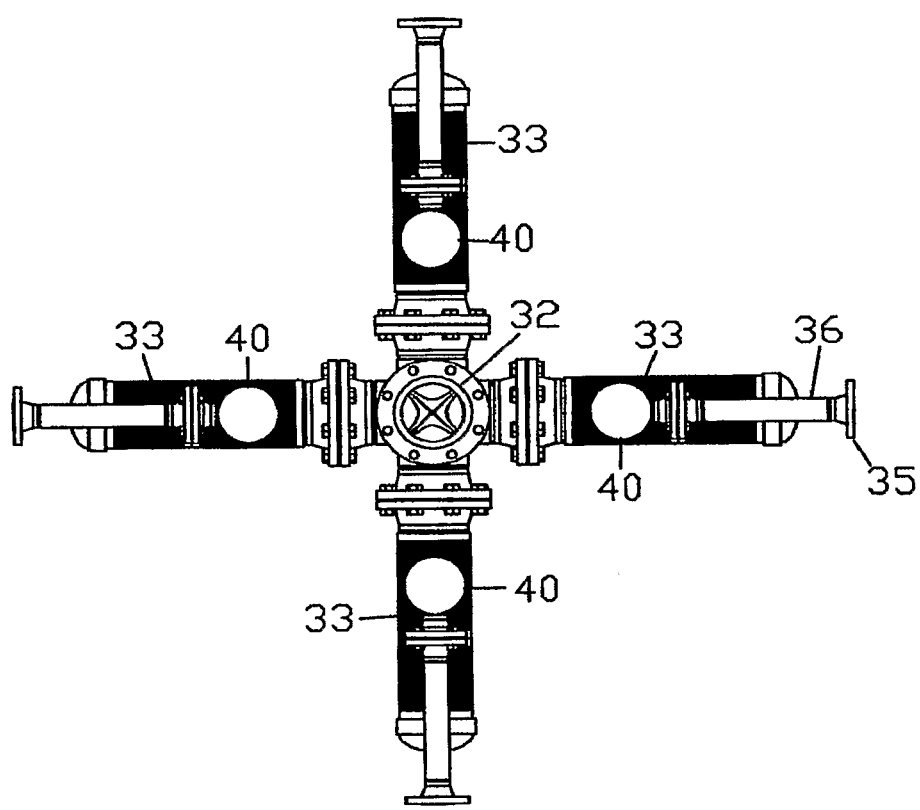
FIG. 4 is a top cross-sectional view similar to that shown in FIG. 2 but with the radial nozzles located just above and aligned with the outlet sieve manifold members showing an alternate location of the radial nozzles for use in the present invention.

FIG. 4 shows an alternate location of the four nozzles shown as dotted circles 42 rotated 45° from the positions shown in FIG. 2 and located just above the mechanical sieve screens 33. By rotating the radial nozzles in line with the mechanical sieve screens and elevating them just above the top tangent of the circular size screens, the jetting stream will have the least degree of interference with from the sieve screens. This location may, for example, be more desirable for filter applications where the majority of the contaminants collect in the first few feet of filter media depth and the filter media does not tend to plug the openings of the sieve screens. The benefit of this arrangement is that "blind-spots" are minimized since the vertical movement of the jetting stream is not impeded by contact with the sieve screen members as may occur in other embodiments shown.

Figure 7:
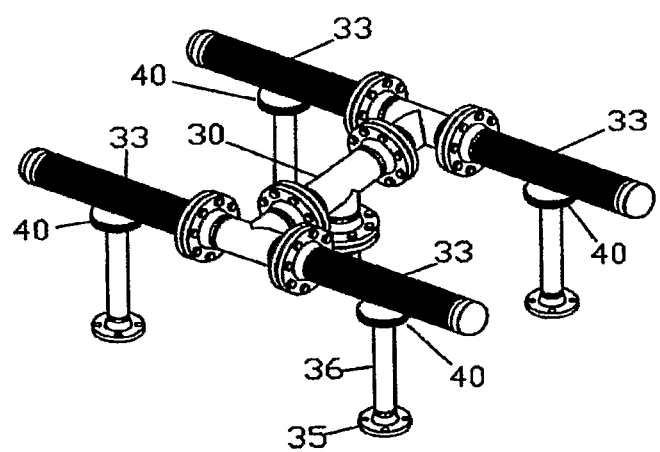
FIG. 7 shows three-dimensional, top-side view of a further alternative embodiment of the present invention where the radial nozzles are located underneath the filtrate outlet sieve manifold members in order to provide cleaning of the sieve manifold screen as well as the filter media in the housing during the cleaning method described herein.

Alternatively, as shown in FIG. 7, the radial nozzles may be placed below and aligned with the outlet sieve screens so that the jetting stream comes in direct contact with the sieve screens to flush and clean filter media and contaminants away from the sieve openings. This nozzle orientation may be preferred in some applications where jetting of the sieve screens is required to agitate media around the sieve screens for contaminant removal and to flush away any media that may have become lodged within the sieve screen openings.

Figure 5:
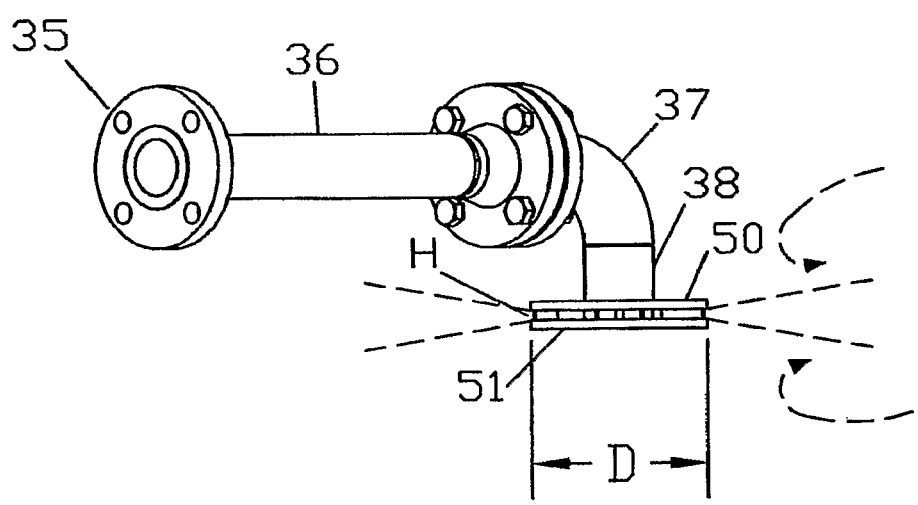
FIG. 5 shows a detailed, three-dimensional view of a radial nozzle and its subcomponents. Dashed lines extend from the annular space of the radial nozzle indicating general motion of the jetting stream from the nozzle and the effect the jetting stream has on the fluids surrounding the nozzle.

FIG. 5 shows a single radial nozzle element contemplated by the inventors for dispersing the jetting stream. The radial nozzle is comprised of a top circular plate 50 and a bottom circular plate 51 into which an opening 52 is placed for connection to a conduit transporting the jetting stream to the nozzle. Each circular plate is of diameter D. The nozzle plates are spaced apart by a gap h, which can be of variable dimension based on the size of the vessel, the filter media being cleaned, and the jetting radius desired. The inventors have found satisfactory performance for a nozzle gap h within the range of 2 mm for small filter systems to 30 mm for large industrial filter applications. In general, the gas diameter h should be smaller than the smallest sized filter media granule in order to prevent said granules from plugging the gap when the nozzle is not in operation. The diameter D of the circular plates typically ranges from 100 mm for small filter systems to 400 mm for large industrial filter systems.

In further reference to FIG. 5, as the jetting stream flows through the void between the plates and exits the outer boundary of the plates, the jetting stream pressure suddenly drops to that of the filter vessel. The gas within the liquid portion of the jetting stream forms a continuous high-velocity bubble dispersion extending away from the nozzle shown in FIG. 5 as the dashed straight lines. As this jetting stream moves away from the nozzle and into the filter media, it causes liquid within the area around the nozzle to circulate, shown in FIG. 5a the curved dashed lines with arrows on the end. By causing circulation of the internal liquid, the amount of liquid added to the jetting stream can be reduced, thereby reducing the overall volume of backwash liquid requiring disposal or reprocessing.

Figure 6:
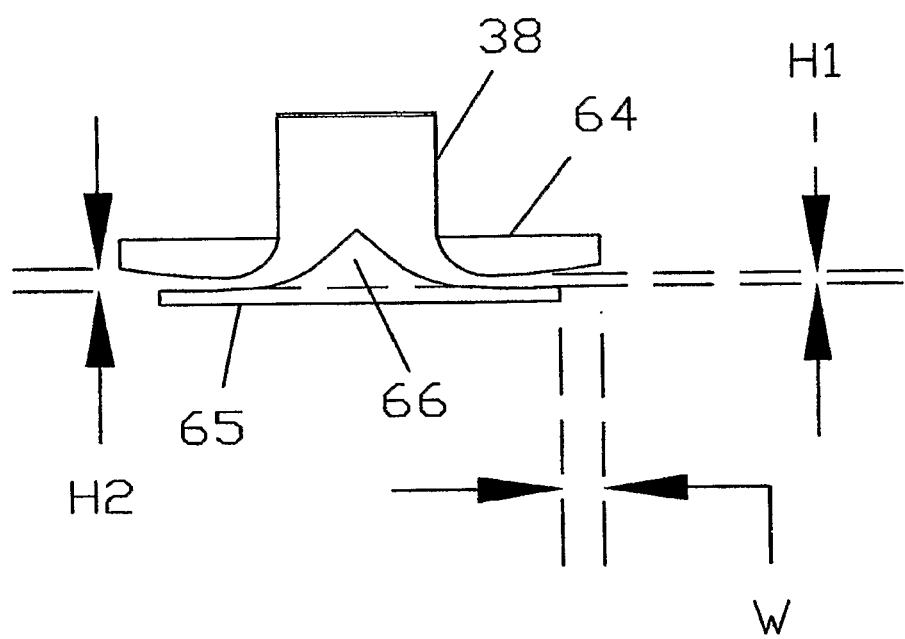
FIG. 6 shows vertical cross-sectional view of an alternate embodiment of the radial nozzle where the nozzle plates are modified to enhance uniformity of jetting stream distribution and reduce media plugging of the nozzle when inactive.

For applications involving high-pressure filter housing, there may be a tendency of filter media to pack into the void space between the plates of the radial nozzle and into the jetting stream conduit. FIG. 6 shows a modified nozzle embodiment that includes a top plate 64 that has diameter slightly larger than the bottom plate 65 to reduce granule packing into the nozzle outlet caused by weight pressure of the media on top of the nozzle. This nozzle also has a tapered plate spacing that is comprised of a narrowing section H1 that is smaller than the outlet height H2. The tapered and non-parallel faces of the top plate 64 and bottom plate 65 also aid in the jetting stream clearing the radial void between the plates when jetting cycle is initiated. The embodiment shown in FIG. 6 also shows a dividing cone 66 that is comprised of a cone extending away from the underside of the bottom plate and into the conduit opening of the top plate. The axial center of the cone is aligned with the axial center of the conduit opening to provide more even distribution of the jetting stream throughout the radial void space between the nozzle plates.

Figure 8:
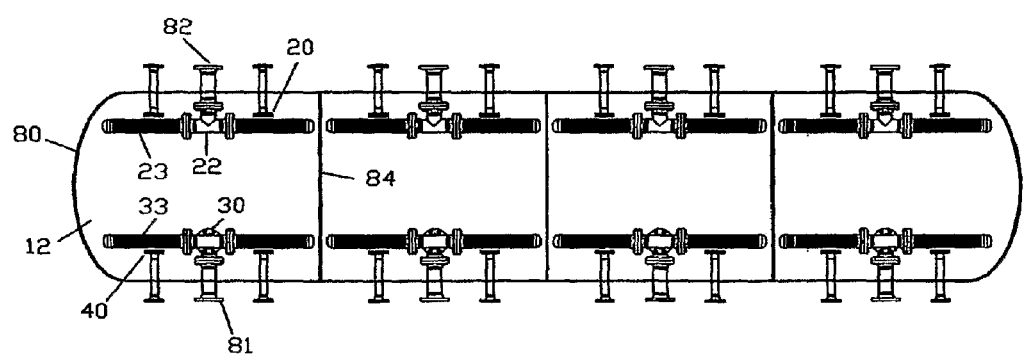
FIG. 8 shows an alternate embodiment of the present invention where a plurality of filter housings, each incorporating the internal members required to carry out the cleaning method herein, is incorporated into one horizontal filter housing separated into individual compartments by internal baffles.

In reference to FIG. 8, an embodiment is presented wherein several filter housings, containing the internal members described herein for carrying out the cleaning method and shown in the previous Figures, are placed inside a singular horizontal vessel 80 and separated by a plurality of dividing baffles 84. Note that for clarification purposes, the component numbers of the embodiment in the figure is shown for one chamber and it is to be understood that each chamber has identical components. Each filter chamber contains a process inlet nozzle 82 and a process outlet nozzle 81. A plurality of piping conduits may connected to these inlet and outlet connections so that the process fluid may flow into each chamber in parallel. In such a filter, a large fluid processing volume is allowed without requiring a large number of radial nozzles to be installed to ensure adequate jetting coverage as might be required if the filtration were carried out in a single large filter vessel. Alternatively, the piping conduits connecting the chambers may be done so that the fluid to be filtered flows through each chamber in a series manner. Such a flow pattern may be advantageous where each chamber contains a different media type that has a unique affinity for a particular fluid contaminant or particle size. In this type of filter arrangement, the amount of jetting stream required to break-up and mobilize the contaminants during the cleaning cycle may be varied independently to each chamber to optimize the cleaning cycle.

In the present invention, the jetting stream flowing to the radial nozzles inside the filter housing is comprised of a pre-mixed stream of a compressed gas and liquid flowing to each nozzle from a common header. Connected to this common header is a source of a pressurized gas and pressurized liquid. Each of these stream flows into the common distribution header through a control element and metering means such that the filter operator can adjust the rate of gas and liquid flowing to the nozzles. Typical gas sources are compressed air or natural gas. However, any inert gas would be applicable. For economic reasons, the liquid source typically used by the inventors is the incoming contaminated process fluid.

The amount of liquid and gas flowing into the common header is largely dependent on the overall size of the filter housing. The inventors have determined that approximately 9 gpm (gallons per minute) of water per square foot of bed area and 0.7 SCFM (standard cubic feet per minute) of gas per cubic foot of bed provide adequate performance for cleaning black walnut shells filtering oil and solids from produced water. Converting these values to a common volumetric units gives and typical value of 1.7 cubic feet of liquid per square feet of bed area per standard cubic feet of gas per cubit feet of filter media inside the housing. This ratio will vary to some extent based on the size of the vessel, the number of radial nozzles used, the size and volume of filter media being cleaned, and the physical characteristics of the contaminants. Therefore, it is understood that part of the operation of this type of filter is adjusting the liquid and gas stream rates to optimize the media cleaning cycle performance while minimizing the amount of contaminated liquid remaining for disposal or recycling.

It will be understood that the foregoing description of the invention is merely exemplary, and that various means and modifications may be employed to carry out the intent of the inventors without departing from the scope of the invention.

We claim:

1. A deep bed filter for filtering contaminants from a contaminated liquid stream, comprising:
   a vessel defining an internal space for containing a liquid to be filtered;
   a bed of granular filter medium disposed inside the vessel in at least a lower region thereof;
   inlet connection and distribution means situated in an upper region of the vessel, for receiving a contaminated liquid and distributing that liquid downwardly and substantially uniformly across the vessel cross section during a filtering cycle;
   outlet filter means, situated in said lower region of said vessel and low in said filter medium, coupled to and circumferentially surrounding an outlet conduit, for withdrawing filtered liquid from the vessel while retaining the granular filter medium within the vessel during said filtering cycle;
   at least one radial nozzle or a plurality of evenly spaced radial nozzles situated low in the vessel and within said medium and located in close proximity to the outlet filter means, for dispensing radially outwardly therefrom during a rejuvenation cycle a controlled mixture of gas and liquid comprising a gas-liquid dispersion wherein gas bubbles are substantially uniformly entrained and dispersed in said liquid in a controlled ratio to said liquid and to agitate and fluidize during said rejuvenation cycle the granular filter medium low in said vessel in at least a region of said medium at which said outlet filter means is situated;
   at least one conduit disposed within the vessel for transporting the controlled mixture of gas and liquid to said at least one radial nozzle; and
   backwash removal means, situated in said upper region of said vessel and separate from said inlet connection and distribution means and said outlet filter means, for withdrawing the controlled mixture of gas and liquid from the vessel during the rejuvenation cycle while retaining the granular filter medium within the vessel during said rejuvenation cycle.

2. The deep bed filter as claimed in claim 1, wherein the outlet filter means comprises outlet mechanical sieves, and wherein said controlled mixture dispensed from said at least one radial nozzle during said rejuvenation cycle directly contacts said mechanical sieves so as to flush and clear any media which may have become lodged in openings in said mechanical sieves.

3. The deep bed filter as claimed in claim 2, wherein said mechanical sieves are situated in a substantially horizontal plane within said vessel, and said plurality of radial nozzles are respectively interspersed between and substantially co-planar with said outlet mechanical sieves.

4. The deep bed filter as claimed in claim 2, wherein said mechanical sieves are substantially co-planar and extend radially outwardly about a central outlet hub, with said plurality of radial nozzles respectively interspersed between and substantially coplanar with said outlet mechanical sieves.

5. The deep bed filter as claimed in claim 4, wherein the top and bottom plate members are of equal diameter, and the spacing between them is approximately equal.

6. The deep bed filter as claimed in claim 2, wherein said mechanical sieves are situated in a first horizontal plane within said vessel, and said plurality of radial nozzles are respectively situated in parallel second horizontal plane substantially proximate thereto but above or below said first horizontal plane containing said plurality of mechanical sieves, to allow agitation of the medium in the region of each of said mechanical sieves during the rejuvenation cycle.

7. The deep bed filter as claimed in claim 1, wherein the outlet filter means contains mechanical sieves having openings smaller than the smallest granules of medium so that the medium is retained within the vessel during both the filtering cycle and during the rejuvenation cycle.

8. The deep bed filter as claimed in claim 1, wherein said at least one radial nozzle comprises a plurality of radial nozzles, said outlet filter means comprises a plurality of mechanical sieves substantially corresponding in number to the plurality of radial nozzles, and said controlled mixture when respectively dispensed outwardly from said plurality of radial nozzles during said rejuvenation cycle directly contacts respective of said plurality of outlet mechanical sieves so as to flush and clear any media therefrom which may have become lodged in openings in said outlet mechanical sieves.

9. The deep bed filter as claimed in claim 1, wherein both the outlet filter means and the backwash removal means each contain mechanical sieve means having openings smaller than the smallest granules of medium so that the medium is retained within the vessel during both the filtering cycle and during the rejuvenation cycle.

10. The deep bed filter as claimed in claim 1, wherein said backwash removal means comprises a plurality of backwash mechanical sieves and said inlet connection and distribution means comprises a corresponding plurality of apertures situated proximate respective backwash mechanical sieves, such that contaminated liquid exiting said apertures during said filtering cycle directly contacts said backwash mechanical sieves.

11. The deep bed filter as claimed in claim 10, wherein said plurality of apertures are each respectively situated substantially directly above a corresponding respective backwash mechanical sieves so as to flush and clear during said filtering cycle any media which may have become lodged in openings in said backwash mechanical sieves.

12. The deep bed filter as claimed in claim 1, wherein said at least one radial nozzle is/are comprised of a circular top and bottom plate member respectively spaced apart from each other to create a cylindrical void through which said controlled mixture of gas and liquid may exit in a radially-outward manner, with one plate member having a central opening connected to the conduit for permitting passage of the mixture of gas and liquid into said cylindrical void.

13. The deep bed filter as claimed in claim 12, wherein the spacing between the top and bottom plate members is equal to or between 2 millimeters and 30 millimeters.

14. The deep bed filter as claimed in claim 12, wherein the top and bottom plate members are of equal diameter and between 100 and 400 millimeters in diameter.

15. The deep bed filter as claimed in claim 12, wherein the spacing between the top and bottom plate members is substantially equal across a radius of the cylindrical void.

16. The deep bed filter as claimed in claim 12, wherein the plate members are arranged substantially coaxially but spaced apart from each other, and wherein a distance separating top and bottom plate members increases with radial distance away from an axial center of the plate members.

17. The deep bed filter as claimed claim 12, wherein where the circular top plate member has a diameter slightly larger than the bottom plate member.

18. The deep bed filter as claimed in claim 12, wherein said at least one radial nozzle has a flow diverting member which diverts the controlled mixture of gas and liquid so as to distribute said controlled mixture more evenly through the cylindrical void.

19. The deep bed filter as claimed in claim 18, wherein said flow diverting member has a circular base formed from one of said first and second plate members and an opposite pointed end extending outwardly therefrom and toward an other of said top and bottom plate members and centrally into said cylindrical void, for diverting said controlled mixture radially outwardly and into said circular void.

20. The deep bed filter as claimed in claim 18, wherein said flow diverting member comprises a dividing cone having a circular base formed of one plate member and connected to the other plate member and a distal point extending away from the surface of the other plate member along a common axis of the plate members for reducing hydraulic pressure low of the controlled mixture exiting through the radial nozzle and distributing such mixture more evenly through the cylindrical void.

21. The deep bed filter as claimed in claim 1, wherein said liquid in said controlled mixture of gas and liquid comprises said contaminated liquid stream, so as to eliminate a need for storing a contaminant-free liquid for use during said rejuvenation cycle.

22. The deep bed filter of claim 1, wherein said controlled ratio of gas to liquid is formed outside said vessel, and said controlled ratio is further variably adjustable to allow optimization during said rejuvenation cycle of the action of said gas bubbles in not only breaking apart contaminant agglomerations within said filter medium but further themselves agglomerating onto said contaminants and thereafter causing said contaminants to rise within said filter medium and said vessel to thereafter be collected by said backwash removal means situated in said upper region of said vessel.

23. The deep bed filter as claimed in claim 1, wherein:
(a) said vessel is substantially cylindrical, of diameter "D";
(b) said outlet filter means comprises a plurality of radially outwardly-extending mechanical sieves uniformly radially spaced from each other and located in a horizontal plane;
(c) said at least one radial nozzle comprises a plurality of radial nozzles substantially corresponding in number to the plurality of outlet mechanical sieves, and respectively interspersed between respective mechanical sieves and co-planar therewith, about a circular arc of radius "R", and
(d) wherein "R" is in the range of 25-35% of diameter "D" of said vessel.

24. A method of filtering contaminants from a liquid stream by providing a deep bed filter as claimed in claim 1, comprising the steps of:
filtering the contaminated liquid stream through the granular filter medium during said filtering cycle;
backwashing for a period the medium with said controlled mixture of liquid and gas bubbles during said rejuvenation cycle, via a jetting stream from said one or more radial nozzles;

collecting the controlled mixture of liquid and gas and entrained contaminants with said backwash removal means situated in said upper region of said deep bed filter; and discharging the mixture of gas and liquid from the deep bed filter during said rejuvenation cycle while retaining the granular filter medium within the deep bed filter during said rejuvenation cycle.

25. The method as claimed in claim 24, further comprising the steps of locating said radial nozzle(s) in proximity to said outlet filter means, and directing via said nozzle(s) said jetting stream into contact with an exterior surface of said outlet filter means during said rejuvenation cycle.

26. The method as claimed in claim 24, wherein said controlled mixture is formed from a controlled ratio of gas to liquid for said rejuvenation cycle, and is further formed outside said vessel, and said controlled ratio is further variably adjustable to allow optimization of the action of said gas bubbles in not only breaking apart contaminant agglomerations on said filter granules but further themselves agglomerating onto said contaminants and thereafter causing said contaminants to rise within said vessel.

27. The method as claimed in claim 26 wherein:
the controlled mixture is comprised of a mixture of a gas and water in the ratio between 1.0 and 2.0 cubic feet of water per minute per square foot of bed area per cubic foot of gas per cubic foot of filter media.

28. The method as claimed in claim 24, wherein said contaminated liquid stream is used as said jetting stream.

29. The method as claimed in claim 24, wherein said jetting stream is supplied to a lower region of the vessel via said radial nozzle(s), said nozzle(s) directing said jetting stream radially outwardly within said vessel.

30. The method as claimed in claim 24, wherein:
the contaminated liquid stream comprises water containing suspended oil droplets and solid contaminants.

31. The method as claimed in claim 30, wherein:
the filter media is granulated black walnut shells; and
the flow rate of water through the deep bed filter is between 8 and 10 gallons per minute per square foot of bed area.

32. The method as claimed in claim 31 wherein:
the rate of gas added to the controlled mixture is between 0.5 and 0.9 standard cubic feet per cubic foot of filter medium.

33. A method of filtering contaminants from a liquid stream by providing a deep bed filter as claimed in claim 1, wherein the liquid component of the controlled mixture of liquid and gas is water containing suspended oil droplets.

34. A deep bed filter for filtering contaminants from a contaminated liquid stream, comprising:
a primary housing containing a plurality of separate chambers where each chamber defines an internal space for containing a bed of granular filter media and receiving a contaminated liquid to be filtered, each plurality of separate chambers containing:
an inlet connection and distribution means for receiving a contaminated liquid and distributing that liquid uniformly across the chamber cross-section during a filtering cycle for said each chamber;
an outlet filter means for withdrawing filtered liquid from proximate a bottom region of said each chamber while retaining the granular filter media within said each chamber;
at least one radial nozzle or a plurality of evenly spaced radial nozzles located in a region of said each chamber proximate the outlet filter means, for dispensing during said rejuvenation cycle for said each chamber a controlled mixture of gas and liquid substantially throughout the granular filter media to thereby agitate and fluidize said granular medium in at least a region of said medium in which said outlet filter means is situated; and
a conduit connected to each radial nozzle and extending outside of each of said chambers, for receiving and transporting a controlled mixture of gas and liquid to each of said at least one radial nozzle during said rejuvenation cycle for said chamber; and
backwash removal means separate from each of said inlet connection and distribution means and said outlet filter means, for withdrawing the controlled mixture of gas and liquid from each chamber during the regeneration cycle for said chamber while retaining the granular filter medium within the respective chamber during the rejuvenation cycle for said chamber.

35. The deep bed filter of claim 34, wherein said at least one radial nozzles further direct said controlled mixture on said outlet filter means.

36. The deep bed filter of claim 34 further comprising a plurality of conduits connected to the inlet connection and outlet filter means of each chamber for allowing the contaminated liquid being filtered to flow through the plurality of chambers within the primary housing either in parallel or in series.

37. The deep bed filter as claimed in claim 34, where the contaminated fluid is arranged to flow in a series direction through the plurality of chambers.

38. The deep bed filter as claimed in claim 37 where the average particle size of the granular filter media in each chamber is arranged to decrease in each subsequent chamber in the direction of flow.

39. The deep bed filter as claimed in claim 34, wherein the granular filter medium is granulated black walnut shells.

40. A filtering process for removing contaminants suspended in a contaminated liquid stream, further having a regeneration cycle, comprising the steps of:
disposing a filter media comprised of discrete granules in a vessel so as to form a filtering bed;
passing said contaminated liquid stream downwardly through said filtering bed from an upper region of said vessel downwardly through said filtering bed to thereby filter contaminants from said liquid stream;
directing liquid passed through said filtering bed out of said vessel;
periodically interrupting flow of said contaminated liquid stream downwardly through said filtering bed by a cleaning process comprising the steps of:
(i) injecting gas into said contaminated liquid stream in a controlled ratio of said gas to said liquid to create a jetting stream comprising a gas-liquid dispersion wherein gas bubbles in said jetting stream are substantially uniformly entrained and dispersed in said liquid in a controlled ratio to said liquid within said jetting stream;
(ii) directing said jetting stream to a plurality of nozzles located in a lower region of said filtering bed within said vessel and dispensing said gas-liquid mixture from said plurality of nozzles interposed within the filter media in a region of circumferential filter means surrounding an outlet from said vessel;
(iii) fluidizing and agitating the discrete granules in said filtering bed using said nozzles and causing agglomerations of contaminants within interstitial spaces between said granules to be broken up and agglomerate onto said gas bubbles and become entrained in said jetting stream and thereby freed from said granules and caused to rise with said gas bubbles in said vessel;

(iv) inducing an outflow of liquid and contaminants out of said vessel from an upper region of said vessel; and (v) venting accumulated jetting gas from the vessel.

41. A method of filtering contaminants from a contaminated liquid stream using a filter medium comprising filter granules which are contained within a vessel, said vessel having an inlet distributor and an outlet having a mechanical sieve means, wherein the contaminants in said contaminated liquid stream are first agglomerated on a surface of, or in interstitial spaces around, the filter granules, and periodically removing the contaminants from the filter granules, said step of periodically removing the contaminants characterized by the further steps of:

interrupting the contaminated liquid stream entering the vessel via said inlet distributor during a rejuvenation cycle;

establishing during said rejuvenation cycle a jetting stream comprised of a controlled ratio of a gas and a liquid in a gas-liquid dispersion wherein gas bubbles in said jetting stream are substantially uniformly entrained and dispersed in said liquid in a controlled ratio to said liquid within said jetting stream;

directing and flowing said jetting stream within the filter medium at a controlled rate at a location proximate a bottom region of said filter medium within said vessel and proximate outlet filter means surrounding a fluid outlet from said vessel, such that said jetting stream and gas bubbles entrained therein agitate both the outlet filter means and the filter granules in said filter medium and further dislodge and entrain within said jetting stream the contaminants previously agglomerated on the surface of, or lodged in said interstitial spaces between, the filter granules;

withdrawing the mobilized contaminants entrained in said jetting stream from the vessel via a screened port situated in an upper region of the vessel;

removing gas which has risen to an upper region of said vessel, from said upper region of said vessel;

ceasing flow of the jetting stream;

waiting a period of time to allow at least a substantial portion of the cleaned media to settle to a bottom of the vessel; and reestablishing flow of the contaminated liquid stream into the vessel.

* * * * *